United States Patent [19]

Cutburth

[11] Patent Number: 4,892,283
[45] Date of Patent: Jan. 9, 1990

[54] STABLE MIRROR MOUNT

[75] Inventor: Ronald W. Cutburth, Bulls Gap, Tenn.

[73] Assignee: The United States of America as represented by the United States Department of Energy, Washington, D.C.

[21] Appl. No.: 207,894

[22] Filed: Jun. 16, 1988

Related U.S. Application Data

[63] Continuation of Ser. No. 68,766, Jun. 29, 1987, abandoned, which is a continuation of Ser. No. 783,069, Oct. 3, 1985, abandoned, which is a continuation of Ser. No. 548,811, Nov. 4, 1984, abandoned.

[51] Int. Cl.$^4$ ............................................. A47B 23/00
[52] U.S. Cl. .................................... 248/466; 248/287; 248/178; 269/73
[58] Field of Search ............... 248/466, DIG. 13, 178, 248/660, 476, 287; 269/73, 72; 74/531; 403/53

[56] References Cited

U.S. PATENT DOCUMENTS

| | | | |
|---|---|---|---|
| 1,285,628 | 11/1918 | Craley | 248/DIG. 13 X |
| 1,951,583 | 3/1934 | Swanson . | |
| 2,565,999 | 8/1951 | Teglas et al. | 269/72 X |
| 2,782,661 | 2/1957 | Lewis | 269/73 X |
| 3,019,709 | 2/1962 | Teason . | |
| 3,046,006 | 7/1962 | Kulicke | 248/DIG. 13 |
| 3,511,462 | 5/1970 | De Bazignan . | |
| 3,740,048 | 6/1973 | Lassy et al. | 269/72 X |
| 3,945,600 | 3/1976 | Mallwitz et al. | 248/466 |
| 4,113,223 | 9/1978 | Kalizaki | 248/DIG. 13 X |

Primary Examiner—Ramon S. Britts
Assistant Examiner—David M. Purol
Attorney, Agent, or Firm—Miguel A. Valdes; Roger S. Gaither; William R. Moser

[57] ABSTRACT

An improved mirror mount assembly is disclosed. The mirror mount assembly provides a post assembly slidable in a Y-axis orientation and a nut plate assembly slidable in an X-axis orientation and a device for simultaneously locking the post assembly and the key assembly in a fixed position.

8 Claims, 2 Drawing Sheets

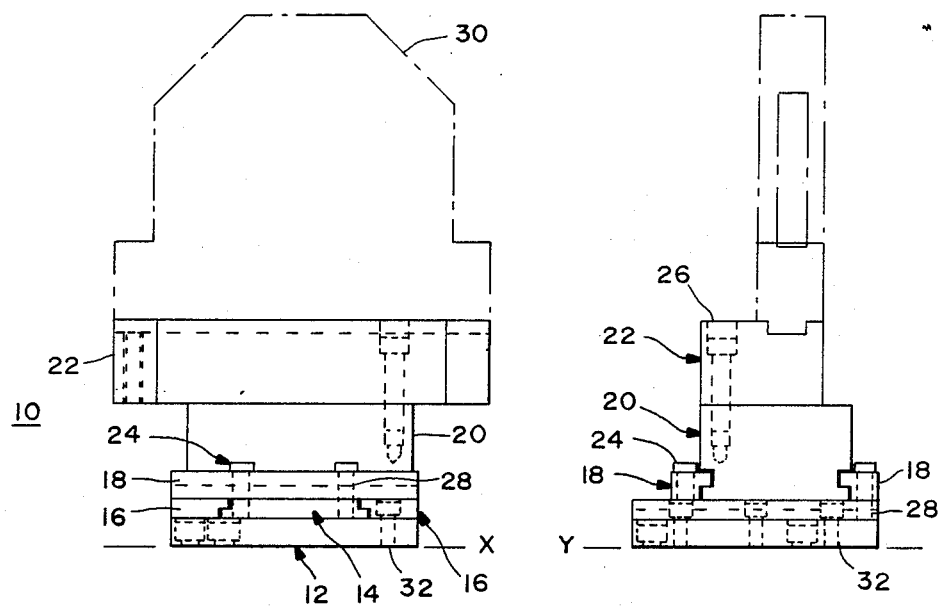
FIG.—1  FIG.—2
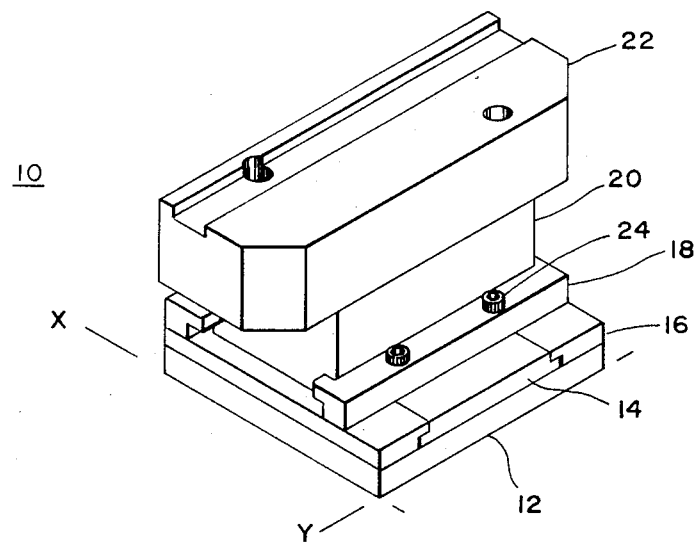
FIG.—4

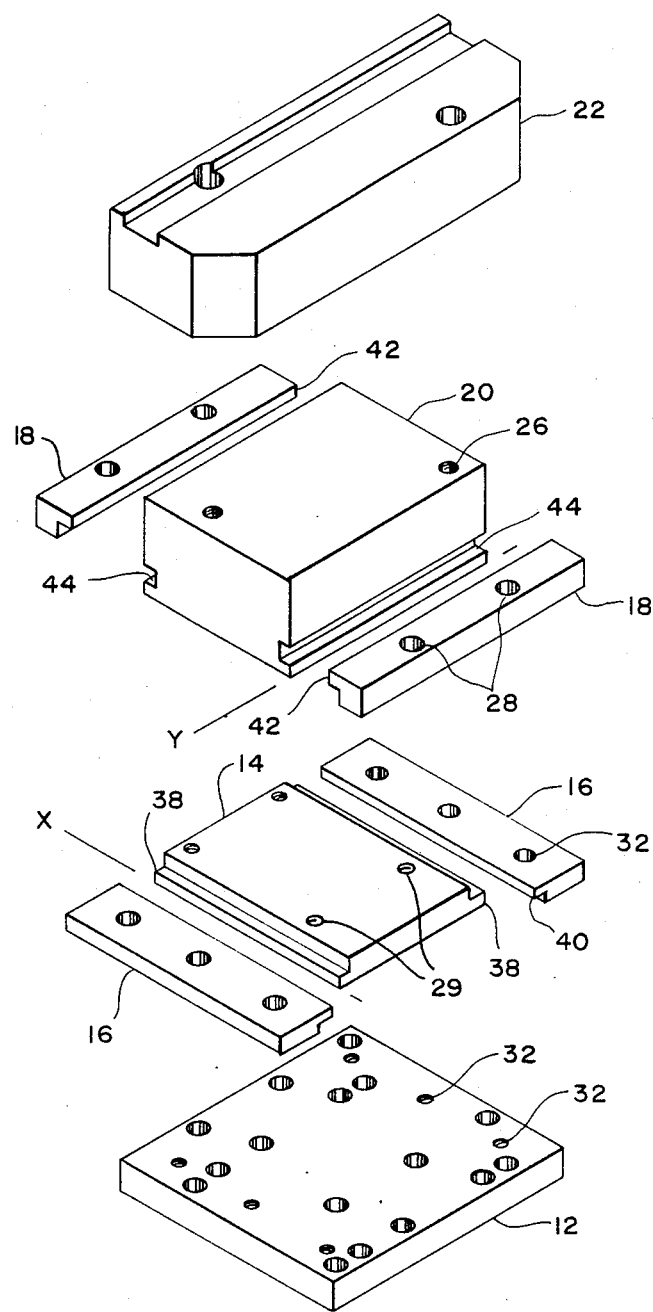
FIG.—3

STABLE MIRROR MOUNT

FIELD OF THE INVENTION

United States government has rights in this invention pursuant to Contract No. W-7405-ENG-48 between the United States Department of Energy and University of California for the operation of the Lawrence Livermore National Laboratory. This is a continuation of application Ser. No. 068,766, filed June 29, 1987 (now abandoned), which is a continuation of application Ser. No. 783,069 filed on Oct. 3, 1985 (now abandoned), which is a continuation of application Ser. No. 548,811 filed on Nov. 4, 1983, now abandoned.

BACKGROUND OF THE INVENTION

The present invention relates to a stable mirror mount for use with optical systems, and more particularly for use with laser technology.

It is extremely important to provide proper optical alignment for a mirror assembly which is to be used with a laser. A mirror assembly for use with lasers must necessarily be quite stable after appropriate alignment with the laser beam, for the reason that any misalignment can have severe adverse effects on the laser beam itself and in addition on the propagation of the laser beam.

A problem with prior art mirror mount approaches is that there generally is required a single alignment locking requirement for each axis of orientation. For instance, in order to lock prior art mirror mount assemblies in an X-Y axis orientation, generally it is required that the X-axis be aligned and locked separately from the Y-axis. This approach is described, for example, in U. S. Pat. No. 3,511,462.

Another problem with prior art approaches is that for a mirror mount assembly that is desirably compact in design, there generally has not been a capability of providing simultaneous locking of an X-Y axis orientation while in addition providing sufficient "mass" to provide for even further improved stability in supporting a mirror for use with laser technology.

SUMMARY OF THE INVENTION

It is an object of the present invention to provide for a stable mirror mount assembly for use with optical systems, including laser technology.

Another object of the present invention is to provide for simplified locking of the mirror mount in an X and Y-axis orientation.

A further object of the present invention is to provide an improved mirror mount with sufficient mass to support a mirror for improved stability.

The objects of the improved mirror mount are achieved by providing in combination a post assembly for supporting a mirror and first keyway means for slidably orienting the post assembly in X-axis orientation.

The improved mirror mount further includes a nut plate for stackably supporting the first keyway means and a second keyway means for slidably orienting the nut plate in a Y-axis orientation.

The nut plate, first and second keyway means and post assembly means have suitable vertical screw holes to provide the capability of simultaneously locking the mirror mount assembly in an X-Y axis orientation in a single step, thereby providing improved stability for the mirror mount assembly for use with laser technology.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

FIG. 1 depicts a front partially cross-sectional view of an improved mirror mount in an X-axis orientation according to the present invention.

FIG. 2 depicts a side, partially cross-sectional view of the improved mirror mount in a Y-axis orientation according to the present invention.

FIG. 3 depicts an exploded perspective view of an improved mirror mount according to the present invention.

FIG. 4 depicts an assembled perspective view of the mirror mount of FIG. 3.

DETAILED DESCRIPTION OF THE DRAWINGS

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Referring now to the drawings, FIGS. 1 and 2 depict frontal and side views, respectively, of an improved mirror mount assembly according to the present invention.

FIG. 1 depicts a partially cross-sectional frontal view of an improved mirror mount assembly oriented in an X-axis viewpoint. Similarly, FIG. 2 depicts an improved mirror mount from a partially cross-sectional side view in a Y-axis orientation.

In FIG. 1, the mirror mount assembly 10 is adapted to support an optic device such as mirror 30 and is desirably utilized with laser beam propagation. Mirror 30 is supported by a mount bracket 22 which in turn is supported by a post assembly 20.

As seen in FIG. 2, post assembly 20 is engaged with a first pair of keyway means including keys 18 so that post assembly 20 is slidably oriented in a Y-axis orientation. Similarly, in FIG. 1 a nut plate (or slide) 14 is in turn engaged with a second pair of keyway means including keys 16 so that the nut plate is slidably oriented in an X-axis orientation. For purposes of discussion, the term keyway means is intended to include the keys 16, 18 and in addition suitable keyways, as will become apparent. The slidable X-Y axes orientation will become more clear when FIGS. 3 and 4 are discussed, particularly in conjunction with the key way means 16, 18.

In FIGS. 1-3, a subplate 12 supports the mirror mount assembly 10. As can be seen in FIGS. 1 and 2, suitable screwholes (e.g., 26, 28, 29, 32) are vertically formed through post assembly 20 (screwhole 26 is partially formed therethrough), nut plate 14 (screwhole 29 formed therethrough), keyway means (screwholes 28, 32 formed therethrough), and subplate 12 (screwhole 32). The post assembly 20, nut plate 14 and first and second pair of keyway means are compressed together by means of conventional screws 24 to provide for simultaneous locking of the mirror mount 10 in an X- and Y-axis orientation to thereby provide for improved stability. This feature will also become more apparent as described below.

In FIGS. 1 and 2, when screws placed in the screwholes are tightened, the effect is to provide a simultaneous clamping of the components in both the X and Y directions. The keyway means 38 and 44 then serves as a clamp to hold post assembly 20 down and nut plate 14 up and at the same time serve as a guide for the post assembly 20.

Referring now to FIG. 3, the subplate means 12 of FIG. 1 is illustrated to show the general pattern of orientation of a plurality of screwholes 32 which permits different orientations or positionings of the mirror mount assembly, as desired.

In FIG. 3, the nut plate means 14 is depicted with the screwholes 29 spaced apart near the respective corners of the nut plate itself. It can be seen that L-shaped elongated projections or "keys" 38 are formed on the nut plate 14. These elongated projections extend in an X-axis orientation along the edge of nut plate 14, which are to engage the "key" 16, as will be described.

FIG. 3 also depicts a view of the first pair of "keys" 16, which have inverted L-shaped projections 40 formed thereon so that in an X-axis position the keys 16 will engage nut plate 14 when locked in position. Similarly, FIG. 3 depicts a pair of keys 18 which also have an L-shaped projection 42 formed thereon and extending in a Y-axis orientation to engage U-shaped slots or keyways 44 formed on post assembly 20.

In FIG. 3, the post assembly 20 is shown, illustrating the U-shaped slots or keyways 44 extending in a Y-axis orientation which is adapted to slidably engage with the pair of keys 18.

By orienting the components in a stacking manner, as illustrated in FIG. 3, it has been found that a larger amount of steel can be utilized for stability purposes, although the geometric pattern can be quite small in terms of size. For instance, the subplate in one embodiment is approximately 3.25×3.25 inches. The components can be made from carbon or heat treated steel and consequently with suitable "stacking" of the components even more stability of the mirror mount is provided.

FIG. 4 depicts an assembled perspective view of the improved mirror mount assembly 10 illustrating the mounting bracket 22, post assembly means 20, the first pair of keyway means, the second pair of keyway means, nut plate assembly means 14 and subplate means 12 in fixed relationship with one another. It can be seen from FIGS. 2 and 4 that the improved mirror mount assembly provide: an improvement for simultaneously locking the assembly in an X- and Y-axis orientation once in proper position by the mere tightening of any one of the screws 24. Once the assembly 10 has been positioned in the proper position, the simple tightening of screws 24 will provide for simultaneous locking of the overall assembly in both an X- and Y-axis orientation.

In FIGS. 3 and 4, the post assembly 20 is not supported in its center portion on the nut plate 14, and consequently that center portion need not be cut away so that the post assembly only rests on the corners or periphery of post assembly 20. This results in a costs savings and can aid in improving the stability by making the corners as flat as possible.

It should also be apparent from FIGS. 1-4 that the stacked components can be slidably oriented to one another, in one embodiment, in an X-Y orientation. For instance, post assembly 20 can be slidably moved in the Y-axis direction while nut plate 14 can be slidably moved in the X-axis direction, and once in the proper position the components can be screwed or bolted together, thereby providing for simultaneous locking of the assembly in a fixed position. The preferred embodiment has been described in terms of an X-Y orientation (e.g., two axes which are orthogonal to one another). However, axis orientations other than orthogonal could be utilized with the improved mirror mount.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A mirror mount for supporting a mirror where said mirror is oriented in an X-ray plane, said mirror mount comprising post assembly means for supporting the mirror, first keyway means for orienting said post assembly means such that said post assembly means are slidable only in a first direction parallel to a Y-axis orientation, and including first screw holes, nut plate means for supporting said first keyway means and including second screw holes, second keyway means for supporting said nut plate means such that said nut plate means are slidable only in a second direction normal to said first direction and parallel to an X-axis orientation such that said post assembly means and said nut plate means are each slidable in a plane parallel to said X-Y plane, and locking means normal to said X-Y plane including a single screw type locking member movable in a third direction orthogonal to said first and second directions between a first position through said first and second screw holes for simultaneously locking in a single step in clamping engagement said first and second keyway means, said post assembly means and said nut plate means in place in both said X-axis and said Y-axis orientation, and a second position for allowing said post assembly means and said nut plate means to slide freely in said X-axis and Y-axis orientations, respectively.

2. A mirror mount as in claim 1 wherein said post assembly means include a base and a pair of keys extending along the base thereof in said y-axis orientation and wherein said first keyway means include a pair of keys extending along said y-axis orientation to engage said pair of keyways.

3. A mirror mount as in claim 2 wherein said nut plate means include a base and a pair of L-shaped projections extending along the base thereon in said X-axis orientation and wherein said second keyway means include a pair of inverted L-shaped projections extending along said X-axis orientation to engage said respective projections of said nut plate means.

4. A mirror mount for supporting a mirror where said mirror is oriented in a first and second axis planar orientation, said mirror mount comprising
   post assembly means,
   first keyway means for orienting said post assembly means in a first direction parallel to a first axis orientation and including first screw holes,
   a nut plate for supporting one of said first keyway means and said post assembly means, said nut plate including second screw holes,
   second keyway means for orienting said nut plate in a second direction parallel to a second, different axis orientation normal to said first axis such that said post assembly means and said nut plate are each orientable in a plane parallel to the plane of said first and second axes, and said nut plate means are slidably moved to a certain orientation,
   substrate means for supporting said mirror mount, and
   locking means normal to said parallel plane including a single screw type locking member movable in a third direction orthogonal to said first and second directions between a first position through said first and second screw holes for simultaneously locking in a single step in clamping engagement said post means, said first and second keyway means, said nut plate means, and said subplate means in place in both said first axis and second axis orientation, and a second position for allowing said post assembly means and said nut plate means to slide freely in said first axis and second axis, respectively.

5. A mirror mount as in claim 4 wherein said first keyway means include means for orientating said post assembly means such that said post assembly means are slidable in said first axis orientation.

6. A mirror mount as in claim 5 wherein said second keyway means include means for orientating said nut plate such that said nut plate is slidable in said second axis orientation.

7. A mirror mount for supporting a mirror where said mirror is oriented in an X-Y plane, said mirror mount comprising
   post assembly means for supporting the mirror,
   first keyway means for slidably orienting said post assembly means only in a first direction parallel to a Y-axis orientation and including first screw holes,
   nut plate means for stackably supporting substantially all of said first keyway means and said post assembly means and including second screw holes,
   second keyway means for slidably orienting said nut plate means in a second direction parallel to an X-axis orientation normal to said Y--axis such that said nut plate means and said post assembly means are each slidably orientable only in a plane parallel to the plane of said X-Y plane,
   subplate means for supporting said mirror mount,
   locking means normal to said X-Y plane including a single screw type locking member movable in a third direction orthogonal to said first and second directions between a first position through said first and second screw holes for simultaneously locking in clamping engagement in a single step said post means, said first and second keyway means, said nut plate means and said subplate means in place in both said Y-axis and X-axis orientation, and a second position for allowing said post assembly means and said nut plate means to slide freely in said X-axis and Y-axis, respectively.

8. In an optic system, the combination comprising
   post assembly means for supporting an optic device where said optic device is oriented in a plane parallel to a first and second axis planar orientation,
   first keyway means for slidably orienting said post assembly means only in a first direction parallel to a first axis orientation and including first screw holes,
   nut plate means for supporting said first keyway means and including second screw holes,
   second keyway means for slidably orienting said nut plate means only in a second direction parallel to a second, different axis orientation such that said post assembly means and said nut plate means are each slidably orientable only in said plane which is parallel to the plane of said first and sewcond axes, and
   locking means normal to said parallel plane including a single screw type locking member movable in a third direction orthogonal to said first and second directions between a first position through said first and second screw holes for simultaneously locking in clamping engagement in a single step said first and second keyway menas, said post assembly means and said nut plate means in both said first axis and said second axis orientation, and a second position for allowing said post assembly means and said nut plate means to slide freely in said X-axis and Y-axis directions, respectively.

* * * * *